(12) United States Patent
Pina

(10) Patent No.: US 7,305,740 B2
(45) Date of Patent: Dec. 11, 2007

(54) SELF-LOCKING CLAMP FOR A HOSE

(75) Inventor: Antonio Carlos Pina, São Paulo (BR)

(73) Assignee: Progeral Industria De Artefatos Plasticos LTDA., Ipero (BR)

( * ) Notice: Subject to any disclaimer, the term of this patent is extended or adjusted under 35 U.S.C. 154(b) by 0 days.

(21) Appl. No.: 10/481,924

(22) PCT Filed: Jun. 25, 2001

(86) PCT No.: PCT/BR01/00081

§ 371 (c)(1),
(2), (4) Date: Jun. 30, 2004

(87) PCT Pub. No.: WO03/001101

PCT Pub. Date: Jan. 3, 2003

(65) Prior Publication Data

US 2004/0237263 A1    Dec. 2, 2004

(51) Int. Cl.
*B65D 63/02* (2006.01)

(52) U.S. Cl. .................... 24/20 R; 24/20 S; 24/20 CW

(58) Field of Classification Search ................ 24/20 R, 24/20 CW, 20 S, 20 TT, 20 EE, 22, 279
See application file for complete search history.

(56) References Cited

U.S. PATENT DOCUMENTS

| | | | | |
|---|---|---|---|---|
| 256,491 A | * | 4/1882 | Luck | 24/20 EE |
| 343,645 A | * | 6/1886 | Meter et al. | 24/20 EE |
| 427,355 A | * | 5/1890 | McLaren, Jr. | 24/20 EE |
| 1,199,595 A | * | 9/1916 | Noble | 24/20 EE |
| 4,930,191 A | * | 6/1990 | Takahashi et al. | 24/20 R |
| 4,930,192 A | * | 6/1990 | Muhr | 24/20 R |
| 4,996,749 A | * | 3/1991 | Takahashi | 24/20 R |
| 5,185,907 A | * | 2/1993 | Kawashima et al. | 24/20 R |
| 5,414,905 A | * | 5/1995 | Kimura et al. | 24/20 R |

(Continued)

FOREIGN PATENT DOCUMENTS

DE      43 05 649 A1    9/1994

(Continued)

OTHER PUBLICATIONS

Patent Abstracts of Japan, JP10318473, Dec. 1998.

(Continued)

*Primary Examiner*—James R. Brittain
*Assistant Examiner*—Ruth C. Rodriguez
(74) *Attorney, Agent, or Firm*—Ladas and Parry LLP

(57) ABSTRACT

A self-locking clamp (1, 1') is described, which comprises a body (9) formed by a profile bent so as to have a substantially cylindrical shape and provided with a first end (6) and a second end (2), substantially overlapping each other in the region of the opening (10) substantially longitudinal, and screwable, the longitudinal opening (10) being substantially adjacent the second end (2), the second end (2) having at least one locking element (4), the second end (2) being substantially concurrent to the plane defined by the body in the region substantially adjacent to the second end (2) and comprising a second locking recess-shaped element (7), located in a region (5) substantially adjacent to the first end (6), the second locking element (7) being inserted into the plane defined by this region (5).

19 Claims, 1 Drawing Sheet

U.S. PATENT DOCUMENTS

| | | | |
|---|---|---|---|
| 5,542,155 A * | 8/1996 | Kimura et al. | 24/20 R |
| 5,855,044 A * | 1/1999 | Cradduck | 24/20 R |
| 5,979,020 A * | 11/1999 | Kimura et al. | 24/20 R |
| 6,038,744 A * | 3/2000 | Zielinski | 24/20 R |
| 6,098,251 A * | 8/2000 | Zielinski | 24/20 R |
| 6,192,555 B1 * | 2/2001 | Nakamura et al. | 24/20 R |
| 6,343,407 B1 * | 2/2002 | Muto et al. | 24/20 R |
| 6,389,650 B1 * | 5/2002 | Yamada et al. | 24/20 R |

FOREIGN PATENT DOCUMENTS

EP     1 087 165 A2     3/2001

OTHER PUBLICATIONS

Patent Abstracts of Japan, JP2001012670, Jan. 2001.
Patent Abstracts of Japan, JP10061855, Mar. 1998.
Patent Abstracts of Japan, JP2001159491, Jun. 2001.

* cited by examiner

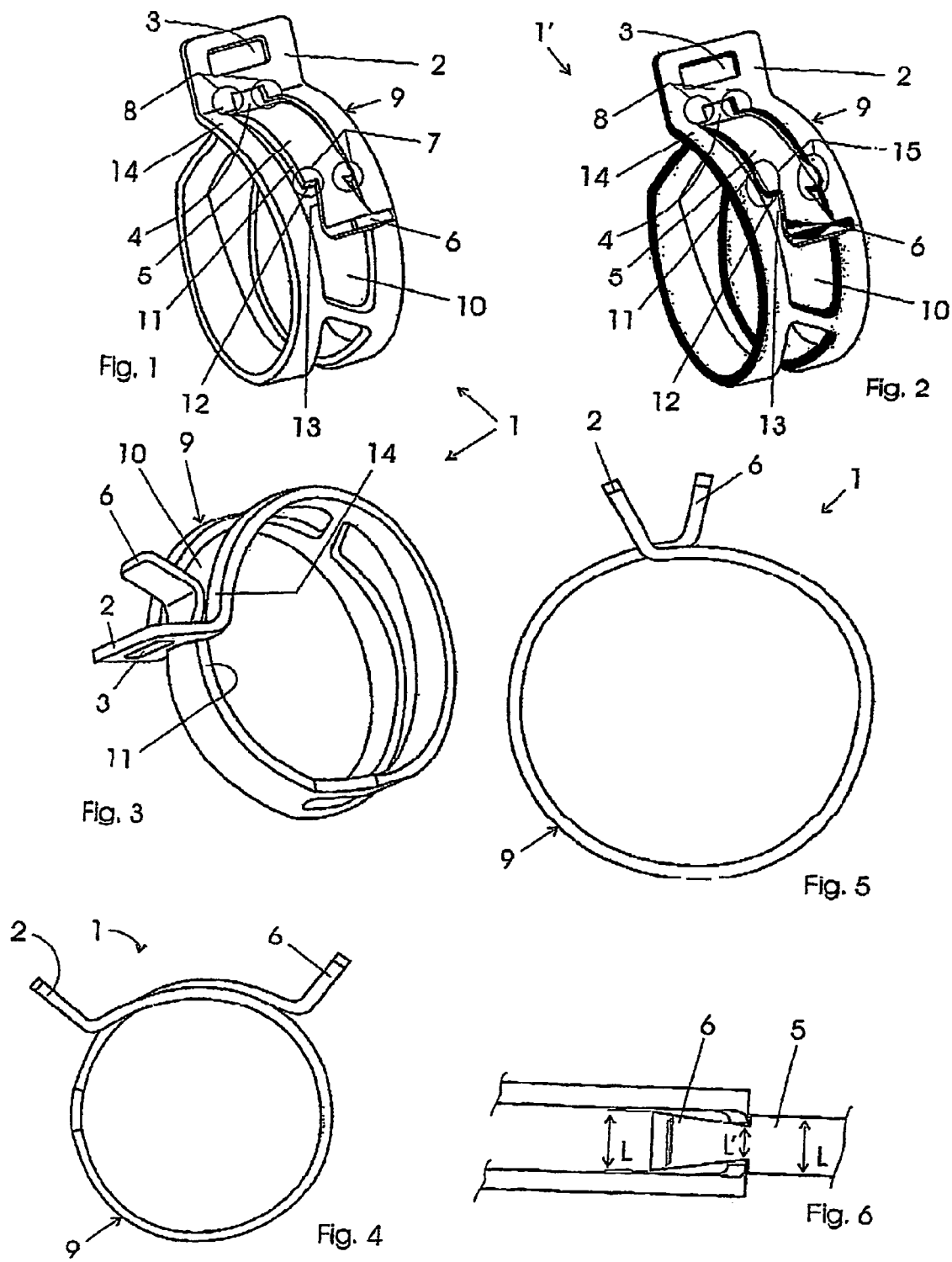

SELF-LOCKING CLAMP FOR A HOSE

FIELD OF THE INVENTION

The present invention relates to a self-locking clamp, especially for use on hoses of motors of automotive vehicles.

DESCRIPTION OF THE PRIOR ART

Conventionally, clamps for use on hoses of automotive vehicles, such as water hoses for cooling the engine, fuel hoses, hydraulic system hoses and others are basically composed of a flattened profile provided with transverse grooves, which is folded so as to form a cylindrical piece. One of the ends of this profile has a threaded fuse (or screw) which, as it is screwed or unscrewed, causes the screw-thread to move and the grooves to follow this movement. In this way, depending upon the direction which the screw is turned, the clamp increases or decreases in diameter, consequently making it possible to fixe/release the hose. However, this clamp configuration has several drawbacks, namely:

First, there is the possibility of a clamp grip as time goes by, because of corrosion, exposure to high thermal gradient and exposure to chemical products, which are very common situations in the compartment of the engine of vehicles. Although such gripping is not uncontrollable, it may render very difficult to withdraw the hose, and ends up damaging the clamp, which is often deformed irremediably upon being withdrawn.

Secondly, it is necessary to use a wrench or a Phillips-type spanner, for example, to withdraw or to fasten the clamp, which makes the process time-consuming. If it is necessary to carry out maintenance of a vehicle with the engine heated, it becomes extremely hard to withdraw or to install the hose in place, a situation that becomes even more difficult in the event that the clamp is located in a difficult-to-access position.

Thirdly, there is the high cost per production unit of each clamp, which needs an additional element (the screw), which has a separate production line and makes the manufacture of this claim expensive. In the case of the automobile industry, which consumes these clamps in enormous quantities, this high cost per unit makes them extremely uninteresting.

Fourthly, there is a increase of the drawback of delay in mounting/dismounting the clamp, a fact that causes delays in the assembly lines of automobiles, which today, when one wishes to reduce costs and increase the number of vehicles produced per worker per day, is highly undesirable.

For the purpose of eliminating these drawbacks, the clamp described in U.S. Pat. No. 4,930,192 was proposed and developed, which is resilient and cylindrical in shape with two screwable protuberant ends. A fist end has a substantially protruding hook, the longitudinal length of which coincides with the length of the profile that originates the clamp prior to bending, which engages a cavity located in the second protuberance, keeping the clamp locked and wide, thus enabling one to insert/withdraw the hose correctly. After putting the hose, it is enough to move the end provided with a hook, so that the ends go apart and the clamp return to its original diameter, tightening the hose and guaranteeing it correct fixation. However, this protuberant hook has the drawback of being susceptible to break, especially in the event of constant handling of the clamp or in case one finds difficulty in locking/unlocking it and unintentionally applies excess force, which will break it.

A second clamp is described in document U.S. Pat. No. 5,596,790 and comprises a longitudinally bent profile, so as to have a circular shape provided with a first protuberant end that has a tooth and a second protuberant end for the clamp to be locked. Adjacent to the second protuberant end there is a reduction in the width of the profile and two projections concurrent with the plane defined by the profile at that point, the projection being fixed to the profile so that their free ends will be facing each other. Each projection defines an angle with the profile, the equivalent angles defined by the two projections being supplementary. In order to lock the clamp, the two protuberant ends are brought close to each other, and the tooth of the first end fits into the space located between the free surfaces of the two projections. However, this clamp has the drawback that at least one of the projections responsible for its locking may be broken, due to its constructive geometry and to the way it reacts to the stresses, facts that were proven after intensive tests on the part of the automobile industry in which it was approved.

A third clamp is described in document WO99/09345 and comprises a longitudinally bent profile so as to have a circular shape and has a first end provided with a hook, which fits into a step at the opposite end of the clamp when the clamp is locked. Thus, in order to unlock the clamp, it is sufficient to force the hook aside, and it will slide as until the step ends, and the clamp will return to the rest position. However, there are two drawbacks in this clamp, which are the fact that the repetition of the locking and unlocking process may cause it to break, due to the angle required for bending the hook, and the fact that the absence of a locking element may cause the clamp to unlock accidentally, for instance, if a box containing it falls, which is especially problematic, mainly while the clamp is being transported between the factory and the automobile industry.

A fourth clamp is described in document EP 0926419, which has an equivalent Brazilian patent application PI 9805531-3. This clamp comprises a longitudinally bent profile, so as to has a circular shape provided with a first end having a hook element like a tooth formed from a tear in the profile itself, and a second end having a cavity. In order to lock the clamp, it is sufficient to bring the two ends together, with help of pliers, for example, and the locking will take place. However, the unlocking of the clamp is more problematic, since it may cause the tooth to break if it is made of inadequate wood or carelessly. This susceptibility makes this clamp little attractive to large consumers such as companies that assemble automobiles.

A fifth clamp is described in document EP 1050705 and comprises a longitudinally bend profile so as to have a circular shape provided with a first end having a T-shaped protuberance and a second end having a T-shaped bore. In order to lock the clamp the T-shaped protuberance is inserted into the T-shaped bore, so that the narrow part of the protuberance will be embedded in the narrow part of the bore. In order to unlock the clamp, suffice it to move the protuberance as far as the wide part of the bore. In spite of the simple functioning, this clamp has the drawback of opening incidentally, just as was commented with regard to the third clamp.

A sixth clamp is disclosed in document U.S. Pat. No. 6,192,555 and comprises a clamping ring which has a first end and a second end. The first and includes a first knob, which contains an abutment face, and the second end includes a second knob, in a root portion of which is formed a locking claw. The locking claw is formed by outwardly raising a portion defined between two spaced-apart slits. The mentioned portion is raised in a radial direction of hose clamp and it is substantially identical in the four disclosed embodiments of the clip revealod.

In order to avoid twisting of the clamp, the locking claw is located approximately at the widthwise center line of the hose clamp, and includes means for engagement with the abutment.

This clamp, however, shows some drawback, as described below.

First, the locking claw suffers from stress concentration since it is a projection. It may cause its collapse after some clamp's releasing operations.

Second, the projection of the locking claw, which is the element responsible to the engagement with the abutment face may deteriorate, difficulting the engagement, or even collapse, due to stress concentration.

Third, due to the necessity of raising a portion defined between two spaces apart slits in order to form the locking claw, it is necessary to perform an additional raising step during the manufacture of the clamp, increasing its production cost and, consequently, its final cost.

Fourth, the abutment face is positioned in the first knob and its lower edge have an inclined face which is engageable with the locking claw, and the lower edge of the abutment face is considerably slim, being thus configured in order to enable the releasing operation of the clamping ring. However, due to its slimness, the lower edge may collapse after some releasing operations, particularly during the operation of the releasing jig T.

The above mentioned drawback makes this clamp little attractive to the consumers.

SUMMARY OF THE INVENTION

The objective of the present invention is to provide a self-locking clamp, especially for use in hoses of automotive vehicles, which can be easily looked and unlocked ever so many times, without presenting fatigue, permanent deformations, and will not unlock accidentally.

Another objective of the present invention is to propose a hose that has at least one self-locking clamp, as indicated in the present invention.

The objectives of the present invention can be achieved by means of a self-locking clamp comprising a body formed by a substantially cylindrical shape bent profile provided with a first end and a second end substantially overlapping each other in the region of a substantially longitudinal opening which is substantially adjacent the second end, the second end being substantially concurrent to the plane defined by the body in the region substantially adjacent to the second end and having at least one first locking element, the first end and the second end engaging when the clamp is in a first, locked position, the clamp comprising at least one second locking element in the form of an engagement cutout, located in a region substantially adjacent to the first end, the engagement cutout defining a cut which engages the first locking element when the clamp is in the first, locked position.

In addition, the objectives of the present invention are achieved by means of a hose containing a self-locking clamp comprising a body formed by a substantially cylindrical shape bent profile provided with a first end and a second end substantially overlapping each other in the region of a substantially longitudinal opening which is substantially adjacent the second end, the send end being substantially concurrent to the plane defined by the body in the region substantially adjacent to the second end and having at least one first locking element, the first end and the second end engaging when the clamp is in a first, locked position, the clamp also comprising at least one second locking element in the form of an engagement cutout, located in a region substantially adjacent to tile first end, the engagement cutout defining a cut which engages the first locking element when the clamp is in the first, locked position.

The present invention has, as advantages, the fact that the clamp thus configured presents high stability when locked, which means that it is almost impossible for it to unlock accidentally. In this way, the transportation and storage of the clamps do not require so much care, which results in lesser total costs for those utilizing them. By virtue of this stability, one can use large packages, which contain numberless clamps, whereas the clamps of the prior art need small or even individual packages, in order to prevent unintentional unlocking, which would elevate the sales price of such clamps. Another advantage is the fact that the constructive geometry of the present clamp prevents breakage in the locking elements, which often occurs with clamps from the prior art, in which these elements undergo high flexion. In addition, this clamp enables one to open and close it as many times as one wants without presenting permanent deformations (since the body undergoes only elastic bendings, which are not sufficient to deform the piece) and distributes stresses homogeneously over the whole diameter of the hose, guaranteeing an ideal fixation thereof.

Finally, the fact that the clamp is fixed to the hose brings high speed in the assembly lines of the equipment that utilizes them, thus saving time, reducing the need for stock and transport, among others and, consequently, decreasing the production costs.

BRIEF DESCRIPTION OF THE DRAWINGS

The present invention will now be described in greater detail with reference to an embodiment represented in the drawings, in which:

FIG. 1 is a first perspective view of a first embodiment of the clamp of the present invention in the unlocked position;

FIG. 2 is a first perspective view of a second configuration of the clamp of the present invention, in the unlocked position;

FIG. 3 is a second perspective view of the clamp illustrated in FIG. 1, in the locked position;

FIG. 4 is a side view of the clamp illustrated in FIGS. 1 and 3, in the locked position;

FIG. 5 is a side view of the clamp Illustrated in FIGS. 1, 3, and 4, in the unlocked position; and FIG. 6 is a bottom view of the locking region of the clamp illustrated in FIGS. 1, 3, 4, and 5, in the locked position.

DETAILED DESCRIPTION OF THE FIGURES

According to a preferred embodiment and as shown in FIG. 1, the self-locking clamp 1,1' of the present invention comprises a body 9, provided with main side ends 11, substantially cylindrical in shape and achieved by bending a substantially rectangular profile in the form of a band or plate. The profile has a length substantially longer than the width, and these two measures in turn are many times as large as the thickness thereof. The profile has a first longitudinal end 6, a second longitudinal end 2, which are substantially opposed, and at least a longitudinal opening 10 located substantially adjacent to the second end 2.

When the profile is bent, configuring clamp 1,1', the first and second ends 6,2 are substantially overlapped in the region of the longitudinal opening 10. The first end 6 and the region 5 adjacent to it occupy the space existing in the longitudinal opening 10.

The first end 6 is substantially concurrent with the plane defined by the region 5 adjacent to it and presents a substantially rectangular surface.

The second end is substantially concurrent with the plane defined by the region 14 adjacent to it and has a substantially rectangular surface, which is provided with a bore 4, which is the first locking element of the clamp 1,1' and a second auxiliary bore 3, which serves to position the tool correctly for unlocking the clamp 1.

The bore 4 has two side walls 8 substantially parallel between each other and substantially perpendicular to the plane defined by the region of the plane substantially adjacent to the second end 2.

In a first configuration of the clamp 1 of the present invention, illustrated in FIGS. 1, 3,4, 5, and 6, in the region 5 adjacent to the first end 6 there are two recesses in the form of substantially triangular engagement cutouts 7, arranged substantially in transverse alignment, which enable the locking of the clamp 1. Each of the engagement cutouts 7 has a first surface 12 substantially perpendicular to the direction of length of the profile which originates the clamp 1, and a second surface 13 which begins in the inner portion of the first surface 12 and ends adjacent to the first end 6 at the main side end 11. Therefore, this cut-out 7 configures a cut that enables one to lock the clamp 1. The distance between the internal portion of both first surfaces 12, which are parallel, defining one same straight line (are aligned), defines a first measure of width L', and the distance relating to the width of the adjacent region 5 defines a second measure of width L, the width L being substantially larger than the width L'. In turn, the distance between the two side walls 8 defines a third width, which is substantially similar to the first width L' and, by inference, smaller than the second width L, in the same way as the side walls 8 and the inner portions of the first surfaces 12 of the cutouts 7 interfere with each other.

Alternatively, one can provide a clamp 1 in which the first end 6 is not concurrent to the plane defined by the region 5 adjacent to it, but rather inserted in this plane.

In a second embodiment of the clamp 1' of the present invention, illustrated in FIG. 2, there are also two recesses in the form of substantially triangular engagement cutouts 7, arranged substantially In transverse alignment in the region 5 adjacent to the first end 6, which enable one to lock the clamp 1, and two end shoulders 15 are additionally provided, which are located substantially at the two main side ends 11, adjacent to the recesses in the form of engagement cuts 7 already mentioned. These end shoulders 15 have a height preferably between seven tenths of a millimeter and two millimeters, facing the outer side of the clamp 1'. Still preferably, both end shoulders 15 are positioned in such a way, that one of them forms a 135° angle with respect to the region 5 adjacent to the first end 6. Both shoulders 15 are positioned substantially opposed to each other, and the planes defined by them are concurrent to each other. Similarly to what was described for the first embodiment of, the clamp 1, each of the engagement cutouts 7 has a first surface 12 substantially perpendicular to the direction of the length of the profile that originates the clamp 1', and a second surface 13 which begins in the Inner portion of the first surface 12 and ends adjacent to the first end 6, at the main end 11. Therefore, this cutout 7 configures a cut that enables one to lock the clamp 1'. The distance between the inner portion of both first surfaces 12, which are parallel, defining the same straight line (they are aligned), defines -a first measure of width L', and the distance relating to the width of the adjacent region 5 defines a second measure of width L, the width L being substantially larger than the width L1. In turn, the distance between the two side walls 8 define a third width, which Is substantially similar to the first width L1, and, by inference, smaller than the first surface, so that the side walls 8 and the inner portions of the first surfaces 12 of the cutouts 7 interfere with each other.

The clamp 1, 1' has two basic positions of functioning, described below.

In a first locked position, the engagement cutouts 7 are interfering with the walls 8 of the bore 4, and the clamp 1, 1' has a diameter substantially greater than that which it will have when it is in the unlocked position (which will be described later), and greater than that of the hose (not shown), which has the fixing function. In order to lock the clamp 1, 1', one uses a tool such as a pair of pliers and presses this tool so as to bring the first and second ends 6, 2 angularly together. In this way, once the body 9 is achieved by bending a profile longitudinally, the angular approximation of the first and second ends 6, 2 increases the diameter of the clamp 1, 1', thus enabling one to place/withdraw the hose. When the ends 6, 2 are substantially adjacent, the spring effect resulting from this operation (as the ends 6, 2 are pressed towards each other, there is a tendency to radial movement of the free ends, due to the bending of the profile in the elastic regime, that is to say, it deforms and tends to return the deformation in the same intensity) tends to move radially the first end 6 and the respective adjacent region 5.

However, since the width of the bore 4 is substantially smaller than the second width L, of the adjacent region 5, this radial movement does not occur. If the ends 6, 2 continue to be pressed, they will reach a point where the engagement recesses 7 and the bore 4 will be aligned and, since the first width L' is substantially equivalent to the third width between the walls 8 of the bore 4, there will be a radial movement "outwardly", so that the narrowing region between both inner portions of the first surfaces 12 of the two cuts tears 7 will be locked or engaged inside the bore 4, prevented from moving spontaneously due to the first surfaces 12, which prevent movement of the ends 6, 2 apart and due to the second surfaces 13, which prevent movement of the two ends 6, 2 apart, even though this approximation is not spontaneous. The spring effect of the body 9 in turn prevents the first end 6 from moving radially in a contrary direction, unlocking the clamp 1,1'. With a view to facilitate the locking of the clamp 1, 1' and rendering its unlocking difficult, the parallel surfaces 8 of the bore 4 form a small entry or inviting angle In a second unlocked position, the clamp 1, 1' has a diameter substantially smaller than that presented when it is locked, so that it presses the hose evenly over the whole diameter, due to its geometry, where no tension accumulates, due to the fact that the clamp 1, 1' is completely cylindrical. The unlocked position tends to be the stable position of the clamp 1,1'; however, its functioning is based on the fact that the hose has a diameter a little larger than that of the clamp 1, 1', when unlocked. In this way, when the clamp 1, 1' is unlocked, it forces the hose, thus decreasing its diameter and providing its correct fixation.

In order to unlock the first embodiment of the clamp 1, one inserts a tool such as a screw-driver into the auxiliary bore 3, pressing the adjacent region 5 to the first end 6 radially towards the center of the clamp 1. In this way, when there is no more interference/lacking between the bore 4 and the cuts tears 7, the clamp 1 returns to the unlocked position, fixing the hose.

In the second embodiment of the clamp 1', the end shoulders 15 serve to bring about an auxiliary locking of the inner portions of the first surfaces 12 of the two cuts 'T inside the bore 4. For the unlocking, which occurs similarly as described for the first embodiment of the clamp 1, it is necessary that the adjacent region 5 of the first end 6 should be radially pressed towards the center of the clamp 1', additionally of what is necessary in the case of said first embodiment of the clamp 1. This additional pressure value should have be sufficient for the piece to deform more than said first embodiment, and this excess pressure value is exactly the value of height of the end shoulders 15. Therefore, it is almost impossible to unlock the clamp 1' accidentally.

Another advantage is that the end shoulders 15 diminishes the possibility of plastic deformations in the end region 5, since they also act as a structural reinforcement. This characteristic results in a higher quality of the end product. Further, this characteristic guarantees the good performance and good functionality of the clamp 1', even if one uses materials that deform in a plastic way more easily.

Another advantage of the second embodiment is the fact that the end shoulders 15 render more reliable the locking of the inner portions of the first surfaces 12 of the two cuts 7 inside the bore 4, in case the clamp 1' is made of less ductile materials, in which case the little deformation capacity would lead to a small contact region between said surfaces 12 and the cuts 7. This little deformability of the material, in this case, would lead to little spring effect of the body 9 to the effect of preventing the first end 6 from moving radially, unlocking the clamp 1'. The end shoulders 15 make extremely difficult the occurrence of accidental opening of the clamp 1' even ion these situations of utilization of little ductile materials in its construction.

Evidently, the use of end shoulders 15 is merely optional and, if they are used, they can assume several shapes, measures or they may be present in a varying number, provided that the objectives of additional fixation and other advantages cited are achieved.

Therefore, in order to unlock the clamp 1, 1', it is necessary to use a tool, which makes impossible the occurrence of the spontaneous or accidental (for instance, caused by falls) unlocking, or during the (incorrect or not) handling of the piece.

The clamp 1, 1' can be locked/unlocked many times, without losing performance or without drawbacks in the functioning, since, due to its geometry and to the fact that the locking is carried out as described above, no permanent plastic deformations of the piece occur, which diminishes its performance and efficiency.

The clamp 1, 1' of the present invention comes out of the factory locked and placed on the hose, in a position substantially 180 degrees from the first and second ends 6, 2 of the body 9 are located, thus facilitating the work of assembling the vehicles in the automobile industry or other activity for which it is used, since the work of the assembler is to put the hose in place and unlock the clamp 1, 1', optimizing the production line of the vehicles and gaining in industrial logistics, since the hose and the clamp 1, 1 are acquired together. Evidently, this association is not compulsory and may have numberless variations of positioning of the clamp 1, 1' on the hose, for example if this situation occurs.

The clamp 1, 1' may be made from any material that meets the project specifications and has elasticity, as for instance ferrous metals, non-ferrous metals or plastics, for example.

Evidently, the clamp 1, 1' may be made by other processes than the bending of a profile, or by bending a profile in transverse direction, or else in another direction, and these variations will be merely different configuration options, being included in the scope of protection of the present invention.

Also, evidently the bore 4 may have other shape than that presented in the preferred embodiment, and more than one bore 4 may be provided. In addition, there may be only one tear 7, or further a plurality thereof, indistinctly.

And finally, as already mentioned, the end shoulders 15 may have different shapes, measures or may be present in a varying number, or merely they may be omitted.

A preferred embodiment having been described, one should understand that the scope of the present invention embraces other possible variations, being limited only by the contents of the accompanying claims, which include the possible equivalents.

The invention claimed is:

1. A self-locking clamp (1, 1') comprising
a body (9) formed by a substantially cylindrical shape bent profile provided with a first end (6) and a second end (2) substantially overlapping each other in the region of a substantially longitudinal opening (10) which is substantially adjacent to the second end (2), the second end (2) having at least one first locking element (4) extending from the longitudinal opening, the first end (6) and the second end (2) engaging each other when the clamp (1, 1') is in a first, locked position, the clamp (1, 1') comprising at least one second locking element in the form of an engagement cutout (7), located in a region (5) substantially adjacent to the first end (6), the engagement cutout (7) defining a cut which engages the first locking element (4) when the clamp (1, 1') is in the first, locked position, said region (5) adjacent to said first end being formed as a planar portion in the plane of the body (9) where said engagement cutout and said cut are contained, the at least one first locking element and the at least one second locking element engaging each other in the first locked position in a plane concurrent with a plane of the body (9) and being disposed with respect to each other and to the longitudinal opening such that the clamp can be unlocked by pressing a portion of the body adjacent to the first end radially towards the center of the clamp.

2. A clamp according to claim 1, characterized in that it comprises two substantially triangular shaped engagement cutouts (7).

3. A clamp according to claim 2, characterized in that the engagement cutouts (7) are located at longitudinal edges (11) of the planar portion at the first end (6) of the body (9).

4. A clamp according to claim 3, characterized in that each of the engagement cutouts (7) has a first surface (12) substantially perpendicular to the respective longitudinal edges (11) and a second surface (13) connecting inner portions of the first surfaces to the first end (6) of the body (9).

5. A clamp according to claim 4, characterized in that the distance between the internal portions of the first surfaces (12) of the two engagement cutouts (7) define a first width (L'), said first width (L') being substantially smaller than a second width (L) of the engagement cutouts adjacent to the first end (6) of the body (9).

6. A clamp according to claim 1, characterized in that the first end (6) is substantially concurrent with the plane defined by the body in the region substantially adjacent to the first end (6).

7. A clamp according to claim 4, characterized in that the first locking element (4) has the shape of a bore provided with two substantially parallel side walls (8) against which said first surfaces (12) engage in said locked position.

8. A clamp according to claim 7, characterized in that the bore (4) has a third width defined by the distance between the two substantially parallel walls (8), the third width being substantially similar to the first width (L').

9. A clamp according to claim 2 further comprising two end shoulders (15), located substantially at the two main side edges (11) of the clamp (1'), adjacent to the engagement cutouts (7).

10. A clamp according to claim 9, characterized in that each of the end shoulders (15) forms a 135-degree angle with the planar portion of the region (5) adjacent to the first end (6).

11. A hose characterized in that it has a self-locking clamp (1,1') comprising a body (9) formed by a substantially cylindrical shape bent profile provided with a first end (6) and a second end (2) substantially overlapping each other in the region of a substantially longitudinal opening (10) which is substantially adjacent to the second end (2), the second end (2) having at least one first locking element (4) extending from the longitudinal opening, the first end (6) and the second end (2) engaging when the clamp (1,1') is in a first, locked position, the clamp (1, 1') also comprising at least one second locking element in the form of an engagement cutout (7), located in a region (5) substantially adjacent to the first end (6), the engagement cutout (7) defining a cut which engages the first locking element (4) when the clamp (1,1') is in the first, locked position, said region (5) adjacent to said first end being formed as a planar portion in the plane of the body (9) where said engagement cutout and said cut are contained, the at least one first locking element and the at least one second locking element engaging each other in the first locked position in a plane concurrent with a plane of the body (9) and being disposed with respect to each other and to the longitudinal opening such that the clamp can be unlocked by pressing a portion of the body adjacent to the first end radially towards the center of the clamp.

12. A hose according to claim 11, characterized in that the clamp (1) is associated to the hose in a position substantially 180 degrees from the place where the first and second ends (6, 2) of the body (9) are located.

13. A hose according to claim 11 characterized in that the clamp (1) is glued to the hose.

14. A spring clamp, comprising:
a spring body (9) having a first end (6) and an opposite, second end (2);
an opening (10) in the spring body adjacent to the second end of the spring body for receiving therethrough the first end of the spring body, whereby the spring body has a substantially cylindrical shape of a first diameter; and
a first locking element (4) and a second locking element (7) on the spring body respectively adjacent the second and first ends of the spring body for engaging each other in a locked position holding the substantially cylindrical shape of the spring body in a second diameter larger than the first diameter and releasing each other in an unlocked position for releasing the spring body, said spring body being biased to the unlocked position whereby the spring body springs toward the first diameter and clamps about an object within the cylindrical shape of the spring body when the first and second ends of the spring body are released from each other into the unlocked positon, the second locking element being a cutout of the spring body adjacent to the first end of the spring body, said first locking element being formed as a bore (4) at said second end extending outwardly from, and in communication with, said opening (10), said second locking element being formed by triangular cutouts at side edges of a planar portion of said body adjacent to said first end, said planar portion being dimensioned to extend through said opening whereby the clamp can be unlocked by pressing a portion of the body adjacent to the first end radially towards the center of the clamp and the clamp can be locked by sliding the planar portion backwardly through said opening until abutment edges of said triangular cutouts engage the second end at said bore.

15. A spring clamp according to claim 14 wherein said bore has a width less than a width of wider ends of said triangular cutouts, said region forming a planar portion of said first end.

16. A clamp according to claim 1 wherein said longitudinal opening (10) is provided in said body adjacent to said second end and extends in the plane of said body, said planar portion (5) at said first end engaging in said longitudinal opening in substantial concurrence with the plane of said longitudinal opening (10).

17. A clamp according to claim 9 wherein said end shoulders (15) extend out of the plane of said planar portion adjacent to said first end (6).

18. A clamp according to claim 2 wherein said body (9) is in the form of a band which is bent to said cylindrical profile and wherein said region (5) adjacent to said first end (6) extends in said longitudinal opening (10) adjacent to said second end (2), said first locking element (4) being formed as a bore in said second end (2), said bore extending outwardly from said longitudinal opening (10), said bore having longitudinal side edges against which transverse surfaces (12) of said cutouts abut in said locked position.

19. A clamp according to claim 18 wherein said cutouts (7) are formed in side edges of said band at said region (5).

* * * * *